No. 722,658. PATENTED MAR. 17, 1903.
G. T. ALLEN & W. W. MOORE.
MACHINE FOR MIXING AND RAISING DOUGH.
APPLICATION FILED SEPT. 12, 1901. RENEWED AUG. 22, 1902.
NO MODEL.
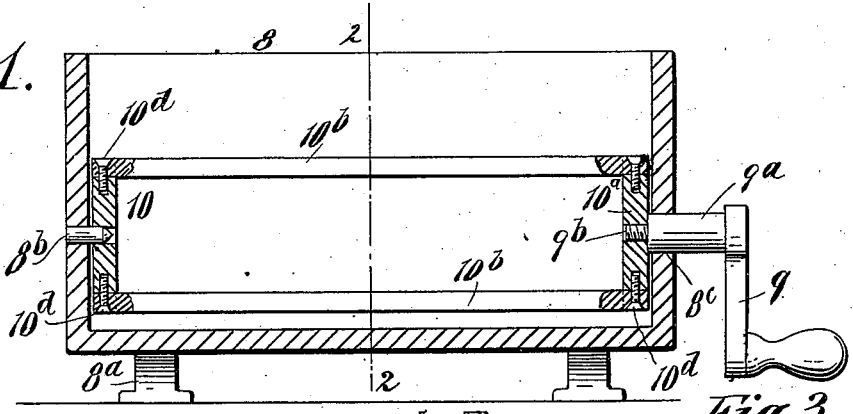
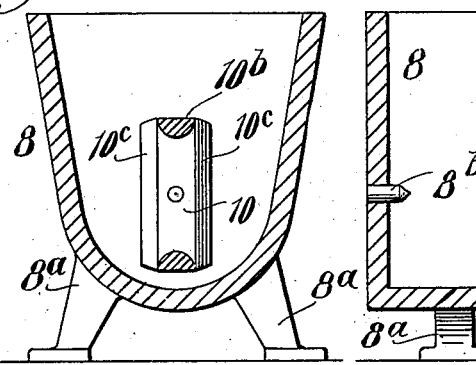
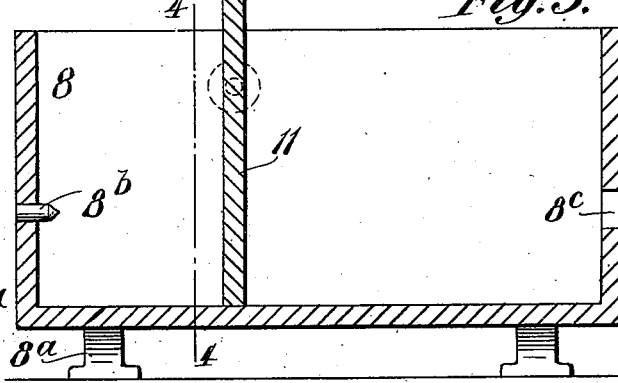
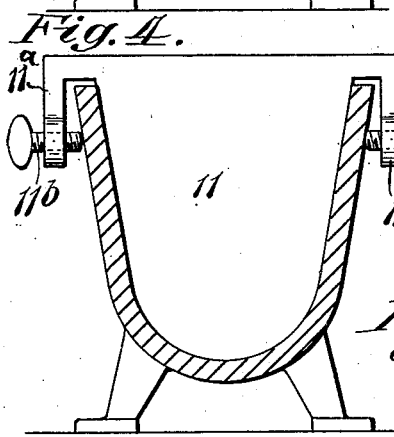
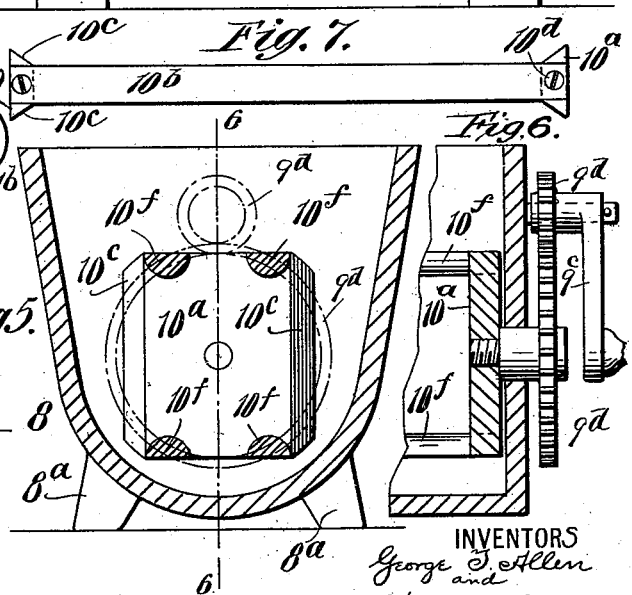
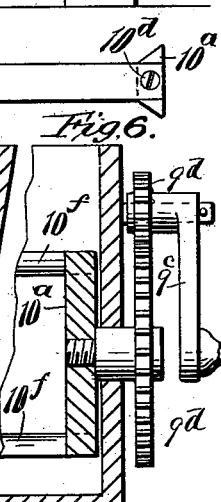
WITNESSES:
Sophia Harnisch
Belle Paterson
INVENTORS
George T. Allen
and
Walter W. Moore
BY
Clark Deemer & Co.
ATTORNEYS

UNITED STATES PATENT OFFICE.

GEORGE T. ALLEN AND WALTER W. MOORE, OF NEW YORK, N. Y., ASSIGNORS TO EXCELSIOR KNEADING MACHINE COMPANY, OF NEWARK, NEW JERSEY, A CORPORATION OF NEW JERSEY.

MACHINE FOR MIXING AND RAISING DOUGH.

SPECIFICATION forming part of Letters Patent No. 722,658, dated March 17, 1903.

Application filed September 12, 1901. Renewed August 22, 1902. Serial No. 120,721. (No model.)

*To all whom it may concern:*

Be it known that we, GEORGE T. ALLEN and WALTER W. MOORE, citizens of the United States, and residents of New York, county of New York, and State of New York, have invented certain new and useful Improvements in Machines for Mixing and Raising Dough, of which the following is a specification, reference being had to the accompanying drawings, forming a part thereof, in which similar figures of reference indicate corresponding parts in all the figures.

The subject of the present invention is a machine for mixing and raising dough; and it consists in the improved construction hereinafter set forth wherein revolving mixing-bars of peculiar shape penetrate the mass with a slicing or cutting effect and immediately thereafter assume such positions that rounded portions will frictionally act on the sliced section of the mass to draw it out and permit it to slip therefrom, plane outer surfaces of the bars reducing the liability of adherence at these points and aiding to maintain the dough well within the mixer to be subjected to the slicing and drawing operations referred to.

By the use of the machine embodying our invention every part of the dough mass is intimately subjected to the mixing operation and efficient exposure to air, thus not only bringing the same to a highly-aerated condition, but increasing the volume thereof, as well as converting it to a condition insuring the more effective raising of the same and greater yield of bread to a given batter of flour.

There are other novel features connected with the improved machine, all of which will be referred to in detail. Among these may be noted the special shape and relation of the end sections or heads carrying the mixing-bars, by which the dough is warded or fended therefrom in the direction of the central portion of the tank or receptacle constituting a part of our mixer and raiser and the dough consequently prevented from objectionably massing contiguous to the receptable ends, at which points it would be ineffectively mixed and aerated, besides liable to clog between the heads and receptacle ends, and thus impede to some extent the easy rotation of the mixing-frame presented by the bars and heads. Provision is made for the convenient detachment and withdrawal of the mixing-frame from the receptacle and the introduction within the latter of a partition by which a subcompartment is formed at one end of the receptacle for the reception of the dough batch, the relatively contracted area in which the batch is thus confined resulting in a greater development and expansion of the gases generated during the raising operation. Inasmuch as the partition can be located at any point within the receptacle, the capacity of the raising-compartment can be varied according to requirement.

In the accompanying drawings, forming part of this specification, Figure 1 is a vertical sectional elevation of our improved machine, showing the same arranged as a dough mixer and aerator. Fig. 2 is a transverse vertical sectional view of the machine shown in Fig. 1, the section being taken on the broken line 2 2 of said latter figure. Fig. 3 is a view somewhat similar to Fig. 1, but showing the mixing-frame removed and the partition in position to provide the contracted raising-compartment. Fig. 4 is a transverse vertical sectional view of the construction illustrated in Fig. 3, the section being represented as taken on the broken line 4 4 in said figure. Fig. 5 is another vertical transverse section illustrating a modified form of mixing-frame. Fig. 6 is a vertical longitudinal detail section taken in the plane indicated by the broken line 6 6, Fig. 5. Fig. 7 is a detail plan view of the mixing-frame shown in Figs. 1 and 2.

The body of the improved machine is presented by a horizontally-extended trough 8, mounted on suitable supports or feet $8^a$ and having a curved bottom. Seated in one end of the trough is a pin $8^b$, which projects horizontally within the trough for a short distance. The other end of the trough has in longitudinal alinement with the pin an opening $8^c$, in which is adapted to bear and turn the barrel 9ᵃ of a hand-crank 9, said barrel having a reduced screw extension projecting into the trough interior, which constitutes the mixing-chamber.

The mixing-frame comprises end sections or heads 10 10ᵃ and longitudinal bars 10ᵇ, the heads being of the approximate rectangular shape indicated in Fig. 2, presenting concaved end recesses and inwardly-converging bevel side faces 10ᶜ. (Shown in Figs. 2 and 7.) Bars 10ᵇ, which are of the plane convex shape indicated in Fig. 2, have their end portions fitting snugly in the recesses therefor in the heads and secured by screws 10ᵈ. An opening centrally in the head 10 receives the pin 8ᵇ, while a correspondingly-located threaded opening in the head 10ᵃ is positively engaged by the extension 9ᵇ of the crank. The opening in the head 10 is of such liberal character laterally that when the crank is disengaged and withdrawn the mixing-frame can be fixed to occupy such diagonal position within the receptacle as will permit its head 10 to be disengaged from the pin 8ᵇ and the frame bodily removed.

With the mixing-frame in position the ingredients of the dough to be mixed are introduced into the receptacle and the crank operated to cause the mixing-frame to revolve at the desired speed. Primarily the bars 10ᵇ will simply effect the commingling of the ingredients; but as the dough becomes stiff the edges of said bars will penetrate the dough mass with a slicing or cutting effect efficiently to divide the same, and a portion of the dough adheres to the rounded surface of the moving bar and is frictionally drawn out by the same until the bar reaches such position as will permit the drawn-out dough to become released and slip from the same. The rounded surfaces of the bars also exert a desired kneading action as they successively strike the dough mass. Tendency of the dough ineffectively to work toward the ends of the trough will be counteracted by the beveled converging faces 10ᶜ of the heads 10 10ᵃ, which operate to push it back within the effective range of the bars. When the dough has become suitably mixed, the crank and mixing-frame are removed and a partition 11 introduced within the trough to provide a compartment at one end of such reduced area as will receive and confine the batch as to insure the efficient raising of the same by reason of the greater expansion of the gases induced by the confined condition of the dough. The slicing and drawing out of the dough in the mixing operation and the restricted character of the raising-compartment will tend to increase the yield of dough both by reason of increased aeration and greater gas expansion.

While the partition 11 may be supported by any suitable provision, we have represented it as having overhanging brackets 11ˢ, in which thumb-screws 11ᵇ turn to bear against the receptacle and rigidly clamp the partition in position.

The number of the bars may be increased, if desired, in machines of large capacity and proportion. In Figs. 5 and 6 are illustrated a series of four bars 10ᶠ, the crank 9ᶜ being associated with speed-reducing gearing 9ᵈ to increase power and provide a means whereby the bars may move slowly.

The detachable character of the mixing-frame and the partition 11 permits these parts and the trough to be readily cleaned after use.

Having now described our invention, what we claim as new, and desire to secure by Letters Patent, is—

1. In a machine of the class described, the combination with a trough or receptacle, of a mixing-frame revoluble therein, and comprising longitudinal bars having inner rounded and outer plane faces presenting side slicing or cutting edges, and means for rotating said frame.

2. In a machine of the class described, the combination with a trough or receptacle, of a mixing-frame revoluble therein and comprising heads with concave recesses and inwardly-converging beveled sides, plane convex bars seated and secured in said recesses and presenting side slicing or cutting edges, and means for rotating said frame.

3. In a machine of the class described, the combination with a trough or receptacle having an internally-projecting horizontal pin 8ᵇ in one end and an alined opening in the other, of a mixing-frame comprising heads with plain and threaded central openings respectively and also with concave recesses and inwardly-converging beveled sides, the head with the plain opening engaged by the pin, longitudinal bars bearing and secured in said recesses, said bars having inner rounded with outer plane faces presenting side slicing or cutting edges, and means for rotating said frame.

In testimony that we claim the foregoing as our invention we have signed our names, in the presence of two witnesses, this 10th day of September, 1901.

GEORGE T. ALLEN.
WALTER W. MOORE.

Witnesses:
SOPHIA HARNISCH,
BELLE PATERSON.